(12) United States Patent
Stahl

(10) Patent No.: US 12,527,491 B2
(45) Date of Patent: Jan. 20, 2026

(54) METHODS AND SYSTEMS FOR MONITORING CARDIORESPIRATORY FUNCTION USING PHOTOPLETHYSMOGRAPHY

(71) Applicant: XHALE ASSURANCE, INC., Gainesville, FL (US)

(72) Inventor: Michael Stahl, Somerville, MA (US)

(73) Assignee: XHALE ASSURANCE, INC., Gainesville, FL (US)

( * ) Notice: Subject to any disclaimer, the term of this patent is extended or adjusted under 35 U.S.C. 154(b) by 916 days.

(21) Appl. No.: 14/921,114

(22) PCT Filed: Apr. 24, 2014

(86) PCT No.: PCT/US2014/035217
§ 371 (c)(1),
(2) Date: Oct. 23, 2015

(87) PCT Pub. No.: WO2014/176386
PCT Pub. Date: Oct. 30, 2014

(65) Prior Publication Data
US 2016/0354011 A1 Dec. 8, 2016

Related U.S. Application Data

(60) Provisional application No. 61/815,490, filed on Apr. 24, 2013.

(51) Int. Cl.
*A61B 5/08* (2006.01)
*A61B 5/00* (2006.01)
(Continued)

(52) U.S. Cl.
CPC ........ *A61B 5/0806* (2013.01); *A61B 5/02416* (2013.01); *A61B 5/0295* (2013.01);
(Continued)

(58) Field of Classification Search
CPC ..................... A61B 5/0295; A61B 5/08–0816
See application file for complete search history.

(56) References Cited

U.S. PATENT DOCUMENTS 4,972,842 A * 11/1990 Korten .................. G16H 40/63
128/204.23
5,685,318 A * 11/1997 Elghazzawi ......... A61B 5/0816
600/529

(Continued)

FOREIGN PATENT DOCUMENTS

WO WO-2012024106 A2 * 2/2012 ........... A61B 5/0205

OTHER PUBLICATIONS

Stiles, Jim. "4.5 Rectifier Circuits." Feb. 27, 2021. https://www.ittc.ku.edu/~jstiles/312/handouts/section_3_5_Rectifier_Circuits_lecture.pdf (Year: 2012).*

*Primary Examiner* — Meredith Weare

(57) ABSTRACT

Provided according to embodiments of the invention are methods, devices and systems for monitoring respiration. Methods described herein include isolating an isolated DC component signal stream, and optionally an isolated AC component signal stream, from the raw PPG signal; calculating a waveform parameter using at least a portion of the isolated DC component signal stream, and optionally, a corresponding portion of the raw PPG signal stream and/or the isolated AC component signal stream; and monitoring respiration in the individual by analyzing the waveform parameter over time.

18 Claims, 4 Drawing Sheets

(51) Int. Cl.
    *A61B 5/024*     (2006.01)
    *A61B 5/0295*     (2006.01)

(52) U.S. Cl.
    CPC .............. *A61B 5/08* (2013.01); *A61B 5/7235* (2013.01); *A61B 5/0059* (2013.01)

(56) References Cited

U.S. PATENT DOCUMENTS

| | | | |
|---|---|---|---|
| 6,430,525 B1* | 8/2002 | Weber | A61B 5/0002 |
| | | | 702/194 |
| 7,690,378 B1* | 4/2010 | Turcott | A61B 5/4818 |
| | | | 600/501 |
| 8,529,459 B2 | 9/2013 | Malker | |
| 2003/0055324 A1* | 3/2003 | Wasserman | A61B 5/0535 |
| | | | 600/323 |
| 2003/0163033 A1 | 8/2003 | Dekker | |
| 2005/0015009 A1 | 1/2005 | Mourad | |
| 2006/0189872 A1* | 8/2006 | Arnold | A61B 5/0205 |
| | | | 600/483 |
| 2006/0241506 A1* | 10/2006 | Melker | A61B 5/14551 |
| | | | 600/529 |
| 2008/0081961 A1 | 4/2008 | Westbrook | |
| 2008/0190436 A1* | 8/2008 | Jaffe | A61M 16/0688 |
| | | | 128/207.18 |
| 2009/0043179 A1 | 2/2009 | Melker | |
| 2010/0192952 A1 | 8/2010 | Melker | |
| 2010/0331715 A1 | 12/2010 | Addison | |
| 2012/0179011 A1 | 7/2012 | Moon | |
| 2013/0066176 A1 | 3/2013 | Addison | |
| 2013/0079657 A1 | 3/2013 | Ochs | |
| 2013/0080489 A1* | 3/2013 | Ochs | A61B 5/02416 |
| | | | 708/201 |

\* cited by examiner

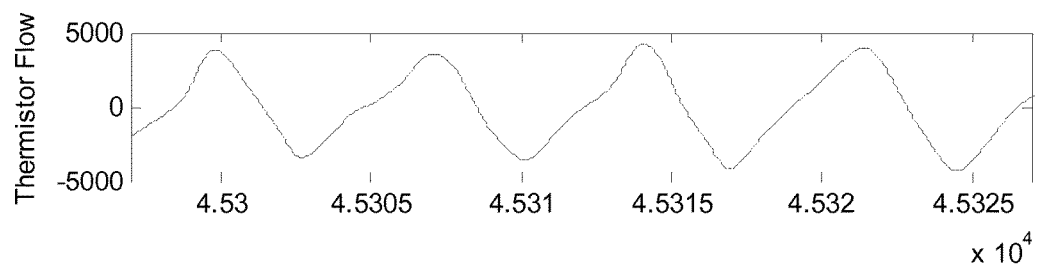
Fig. 3A
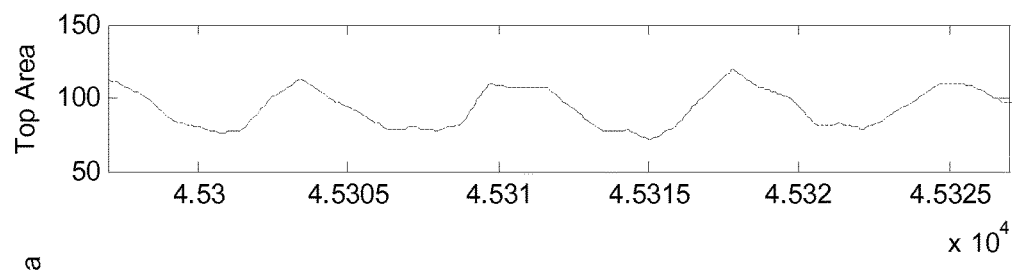
Fig. 3B
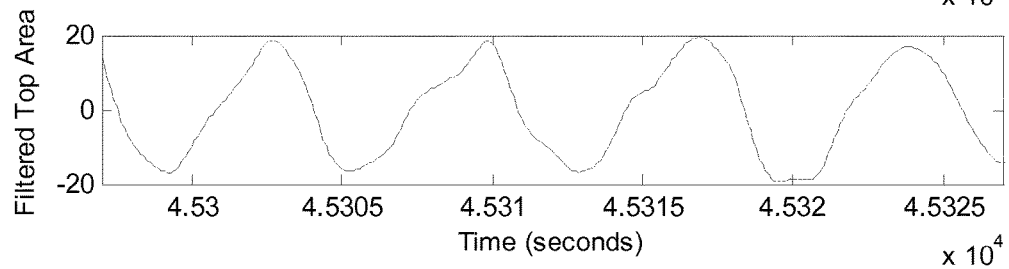
Fig. 3C
FIGURE 3

METHODS AND SYSTEMS FOR MONITORING CARDIORESPIRATORY FUNCTION USING PHOTOPLETHYSMOGRAPHY

CROSS-REFERENCE TO RELATED APPLICATIONS

This application is the 35 U.S.C. § 371 national stage of PCT Application No. PCT/US2014/35217, filed Apr. 24, 2014, which is herein incorporated by reference in its entirety and which also claims priority to, and the benefit of, U.S. Provisional Application No. 61/815,490, filed Apr. 24, 2013, which is herein incorporated by reference in their entirety.

FIELD OF THE INVENTION

The present invention relates to biological sensors, and in particular, to photoplethysmography sensors. The present invention also relates to mammalian respiration and methods and devices for monitoring the same.

BACKGROUND OF THE INVENTION

There is a critical unmet need in the field of medicine for non-invasive monitoring of respiration in spontaneously breathing patients. Presently, most respiratory medical equipment is used for the long-term monitoring of patients receiving mechanical ventilation. Because most mechanically ventilated patients are intubated, many respiratory parameters can be precisely measured in a way not possible with non-intubated patients. These parameters include those obtained from capnometry (end tidal $CO_2$ [$EtCO_2$], respiratory rate and $CO_2$ waveform measurements) and respiratory monitors such as differential pressure transducers, absolute pressure transducers and flow transducers (tidal volume [$V_T$], airway pressure [$P_{aw}$], minute ventilation [$V_E$], respiratory rate [RR], respiratory effort/work of breathing [RE/WOB], inspiratory:expiratory [I:E] ratio, and deadspace measurements). Thus, while patients in the operating room and intensive care unit may receive comprehensive respiratory monitoring, similarly reliable monitoring is not presently available for non-intubated patients who are often ambulatory, such as those on general care floors and other areas of the hospital.

Photoplethysmography, or "PPG", is an optical technique for detecting blood volume changes in a tissue. In this technique, one or more emitters are used to direct light at a tissue and one or more detectors are used to detect the light that is transmitted through the tissue ("transmissive PPG") or reflected by the tissue ("reflectance PPG"). The volume of blood, or perfusion, of the tissue affects the amount of light that is transmitted or reflected. Thus, the PPG signal may vary with changes in the perfusion of the tissue. The PPG signal may also vary with respiration as the PPG signal is responsive to changes in intrathoracic pressure. Thus, PPG remains a promising technique for non-invasive respiratory monitoring.

Much of the previous research related to obtaining respiratory information from the PPG signal utilizes various transforms, such as Fourier Transforms, Short Time Fourier Transforms, wavelets, and the like, to extract component signals based on their frequency. Such methods have been used, in part, because PPG signals have traditionally been obtained from peripheral body sites wherein the respiratory component signal is relatively small and difficult to extract from the other signals, including those due to motion, sympathetic innervation and noise. While such methods may be somewhat useful for intubated patients, when respiration is highly ordered, they often fail to work reliably in spontaneously breathing patients. These techniques also typically require a time window to average a respiration rate (e.g., 45 seconds to several minutes), and so respiratory events are generally not tracked in real time. Additionally, the resulting transforms are often difficult to link to actual physiology in the patient. For example, a peak may be detected at a particular frequency, but what is causing that peak is not easily discernible. Furthermore, respiratory information may be embedded in the area under the cardiac signal curve, its peak-to-peak amplitude or the low frequency component, or any other aspect of the PPG signal, and so the respiratory component may be difficult to cleanly extract.

The nasal alar has recently been shown to provide a very large PPG signal relative to other sites of the body, including the fingers, toes and ears, and a relatively high quality signal due to its lack of sympathetic innervation. The improved PPG signal at the nasal alar site has allowed for a number of physiological parameters, including respiration rate, respiratory effort and venous capacitance to be effectively extracted from the signal. However, further research has been needed to capture and utilize the wealth of information available from such robust signals to more efficiently and effectively monitor respiration, particularly in spontaneously breathing patients.

SUMMARY OF THE INVENTION

Provided according to some embodiments of the present invention are methods of monitoring respiration in an individual. Such methods may include obtaining a raw photoplethysmography (PPG) signal stream from the individual; isolating an isolated DC component signal stream and/or an isolated AC component signal stream, from the raw PPG signal; calculating a waveform parameter using at least a portion of the isolated DC component signal stream, and optionally, a corresponding portion of the raw PPG signal stream and/or the isolated AC component signal stream; and monitoring respiration in the individual by analyzing the waveform parameter over time.

In some embodiments of the invention, the raw PPG signal stream is obtained from light emitted at an IR wavelength. In some embodiments, the raw PPG signal stream is obtained from light emitted at a red wavelength. In some embodiments, at least one waveform parameter is calculated from both a PPG signal stream obtained from light emitted at an IR wavelength and from a PPG signal stream obtained from light emitted at a red wavelength. The waveform parameter calculated from a red PPG signal stream may be compared with a waveform parameter calculated from an IR PPG signal stream, and a confidence metric regarding whether a respiratory event occurred is generated based on the red waveform parameter and the IR waveform parameter.

Provided according to some embodiments of the invention are methods of monitoring respiration in an individual that include calculating a first waveform parameter over time from at least one PPG signal stream; determining whether a respiratory event has occurred based on an analysis of the first waveform parameter over time; calculating a second waveform parameter over time from the at least one PPG signal stream; determining whether a respiratory event has occurred based on an analysis of the second waveform parameter over time; and calculating a confidence metric of whether the respiratory event occurred using the determination based on the first waveform parameter and the determination of the second waveform parameter over time. In some embodiments, the methods further include effecting a predetermined reaction if the confidence metric is above a predefined value. Secondary respiration sensors may also be used to define a confidence metric.

Also provided are microprocessing devices and systems configured to perform methods according to embodiments of the invention.

BRIEF DESCRIPTION OF THE DRAWINGS

The following drawings are provided to illustrate various aspects of the present inventive concept and are not intended to limit the scope of the present invention unless specified herein.

FIG. 3 is an example of how a single waveform parameter can be processed for respiratory information. FIG. 3A shows waveform taken from a thermistor at the nose, whereby the signal varies with change in temperature due to inhalation and exhalation. FIG. 3B shows a single waveform parameter (Top Area) taken from the IR channel and FIG. 3C shows that same parameter after a band-pass filter.

DETAILED DESCRIPTION OF EMBODIMENTS OF THE INVENTION

Figure 1:
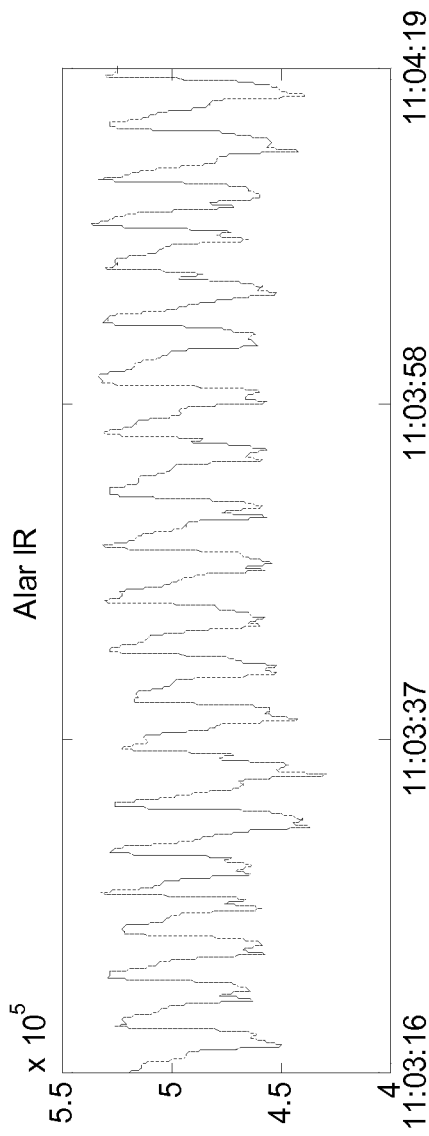
FIG. 1A shows the raw IR PPG signal from the nasal alar and FIG. 1B shows the raw IR PPG signal taken from the finger.
Figure 1:
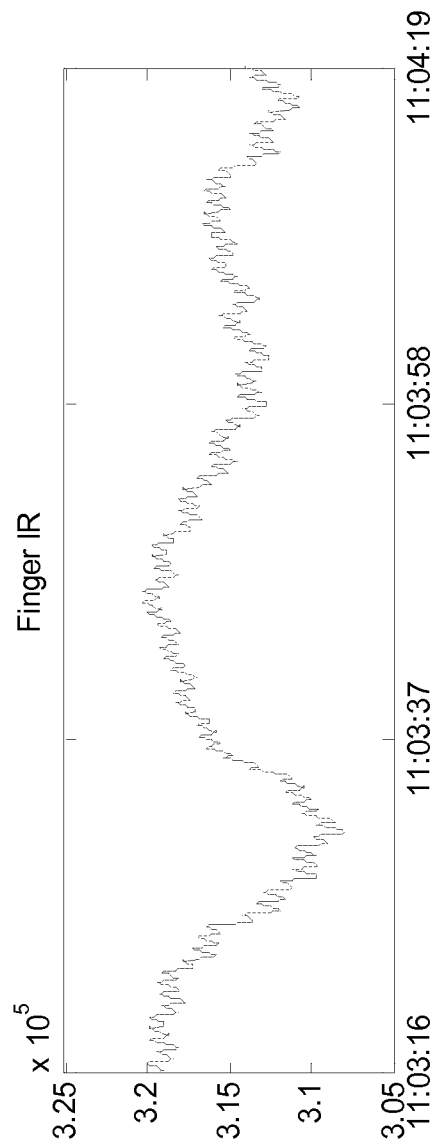

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element is referred to as being "on" or "adjacent" to another element, it can be directly on or directly adjacent to the other element or intervening elements may also be present. In contrast, when an element is referred to as being "directly on" or "directly adjacent" to another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers refer to like elements throughout the specification.

It will be understood that, although the terms first, second, etc. may be used herein to describe various elements, these elements should not be limited by these terms. These terms are only used to distinguish one element from another. Thus, a first element discussed below could be termed a second element without departing from the teachings of the present invention.

Methods of Monitoring Respiration

Provided according to embodiments of the present invention are methods, devices and systems for monitoring respiration in individuals by evaluating changes in PPG waveform parameters over time. Methods of monitoring respiration in individuals according to some embodiments of the present invention include obtaining a raw photoplethysmography (PPG) signal stream from the individual; isolating a separate DC component signal stream, and optionally a separate AC component signal stream, from the raw PPG signal; calculating at least one waveform parameter using at least one of the DC component signal stream, the AC component signal stream and the raw PPG signal stream; and monitoring respiration in the individual by analyzing the waveform parameter over time. The methods described herein may allow for respiration detection in real time. As used herein, the term "real time" means that the respiratory event (such as a breath) is reported to the caregiver at substantially the same time that the respiratory event occurs, e.g., on a breath to breath basis.

The Individual

As used herein, an individual, also referred to a patient, includes any mammal, including humans of any age. The individual may be monitored with PPG in any care setting including, but not limited to, hospitals (e.g., operating room (OR), intensive care unit (ICU), general care floors, or during transport therein); nursing homes, medical offices, medical transport, and homes. While the methods, devices and systems described herein may be used for spontaneously breathing patients, they may also, in some cases, be useful for ventilated patients as well.

The PPG Signal

The PPG signal stream may be obtained in any suitable manner and at any suitable physiological site. However, for best results, the PPG signal will be obtained at a site at or on the head of the individual (also referred to herein as a "central source site"). Such sites include, but not are limited to, the ear, nasal alar, nasal septum, nasal columella, forehead, cheek, lip, ophthalmic artery, and pre-auricular or post-auricular sites. As used herein the term "signal stream," also referred to as a "waveform," refers to the PPG signal plotted as a function of time.

The PPG signal stream may be obtained by securing at least one PPG sensor (also referred to as a PPG probe) to the central source site of the individual. The term "secure" means to attach sufficiently to the tissue site to allow for a suitable PPG signal to be generated. In some cases, the sensor is configured to secure onto a tissue site such that no additional support is necessary to allow for a suitable PPG signal to be reliably generated. However, in some cases, the sensor may be secured with the aid of an external support, for example, an additional structural support, a wire or cord, or an adhesive product such as tape. Such supports may be desirable to stabilize the sensor to prevent against signal loss, for example, due to the patient's movement, or due to movement (e.g., jostling, pulling, pushing) of the sensor or a cable attached thereto.

The PPG sensors include one or more components that emit light, and such components will be referred to herein as "emitters." As used herein, the term "light" is used generically to refer to electromagnetic radiation, and so the term includes, for example, visible, infrared and ultraviolet radiation. Any suitable type of emitter may be used, but in some embodiments, the emitter is a light-emitting diode (LED). In particular embodiments, a first emitter emits light at a first wavelength, and a second emitter emits light at a second wavelength. In some cases, a single emitter may emit light at a first wavelength and a second wavelength. One or more photodetectors, also referred to as "detectors", are also included in the PPG sensor. The detector is configured to detect light from an emitter, and this detected light generates a PPG signal. Any suitable photodetector may be used. However, examples of photodetectors include photodiodes, photoresistors, phototransistors, light to digital converters, and the like.

The PPG signal and the waveform parameters defined therefrom may be obtained from one or multiple wavelengths of light (e.g., IR and red wavelengths) and in some cases, comparing the waveform parameters at different wavelengths may allow for more accurate determination of respiratory events.

In some cases, the PPG signal is "conditioned" or filtered prior to isolation of the AC and DC component signals. In general, such conditioning is achieved by band pass filters, which may filter out undesirably high or low frequency noise in the signal. As used herein, a "raw PPG signal" includes both completely unprocessed signals and those that have been conditioned.

According to embodiments of the invention, the raw PPG signals are separated into an isolated AC component signal stream (the pulsatile component), an isolated DC component signal stream (the non-pulsatile component), or both, and the isolated AC and/or DC signal streams, optionally with the raw PPG signal, may be used to monitor respiration in the individual. The separation of the AC and DC component signal streams may be achieved by a number of different methods, but in some embodiments, the components are separated as discussed in U.S. Pat. No. 8,529,459, which is herein incorporated by reference in its entirety. As another example, in some embodiments, the DC component signal stream is determined by interpolating the peaks and interpolating the troughs of the raw signal stream and then averaging the two interpolated lines (interpolated peak line and interpolated trough line) to produce an isolated DC component signal stream (the DC component waveform). The isolated DC component stream may be subtracted from the raw signal stream to produce the AC component signal stream. Other methods of separating the pulsatile from the non-pulsatile components of PPG signals that are known in the art may also be used in some embodiments.

While in some embodiments, only the DC component signal stream is monitored to monitor respiration in the individual, in some embodiments, both the AC and the DC component signal streams are monitored. One reason for monitoring both the AC and DC component signal streams is that the AC and DC components both may provide information regarding respiration (including respiratory rate, effort, obstruction, and the like) and the strength of each signal may vary based on the position or physiological condition of the individual. It may also be useful to analyze/compare an isolated AC component signal stream and/or isolated DC component signal stream obtained at a first wavelength of light from an isolated AC component signal stream and/or isolated DC component signal stream obtained at a second wavelength of light. Thus, in some embodiments, PPG signals may be obtained from two or more wavelengths of light, and each PPG signal may be separated in an AC and DC component signal stream. For example, in some cases, an IR PPG signal stream may be separated into an IR AC component signal stream and/or an IR DC component signal stream, and a red PPG signal stream may be separated into a red AC component signal stream and/or a red DC component signal stream. In particular embodiments, waveform parameters may be generated from one, two or more of the IR and Red isolated component signal streams.

In some embodiments of the invention, the AC component signal may be obtained by removing the respiratory component from the signal, either the respiratory component as determined by PPG or the respiratory component as obtained from a secondary respiration detector. FIG. 1 shows the raw IR PPG signal obtained from the nasal alar (1A) and the finger (1B). It can be seen that when the respiratory signal is very strong, such as at central source sites, the respiratory component of the signal dominates the raw PPG signal. Thus, when a pulsatile PPG component is desired, the respiratory component, either that obtained from the PPG or that obtained from a secondary respiration detector, may be extracted from the raw PPG signal, to provide the AC component signal.

Determining and Processing Waveform Parameters

Waveform parameters can be generated from at least one of the isolated DC component signal stream, the isolated AC component signal stream, and the raw PPG signal stream. These waveform parameters may be generated from any suitable PPG signal, including those obtained from red and/or IR light. One or more of the waveform parameters may be calculated over time and the change in the waveform parameter(s) over time may vary with respiration and so respiration events, such as breaths and/or respiratory efforts, in the individual may be tracked with the waveform parameter(s).

Figure 2:
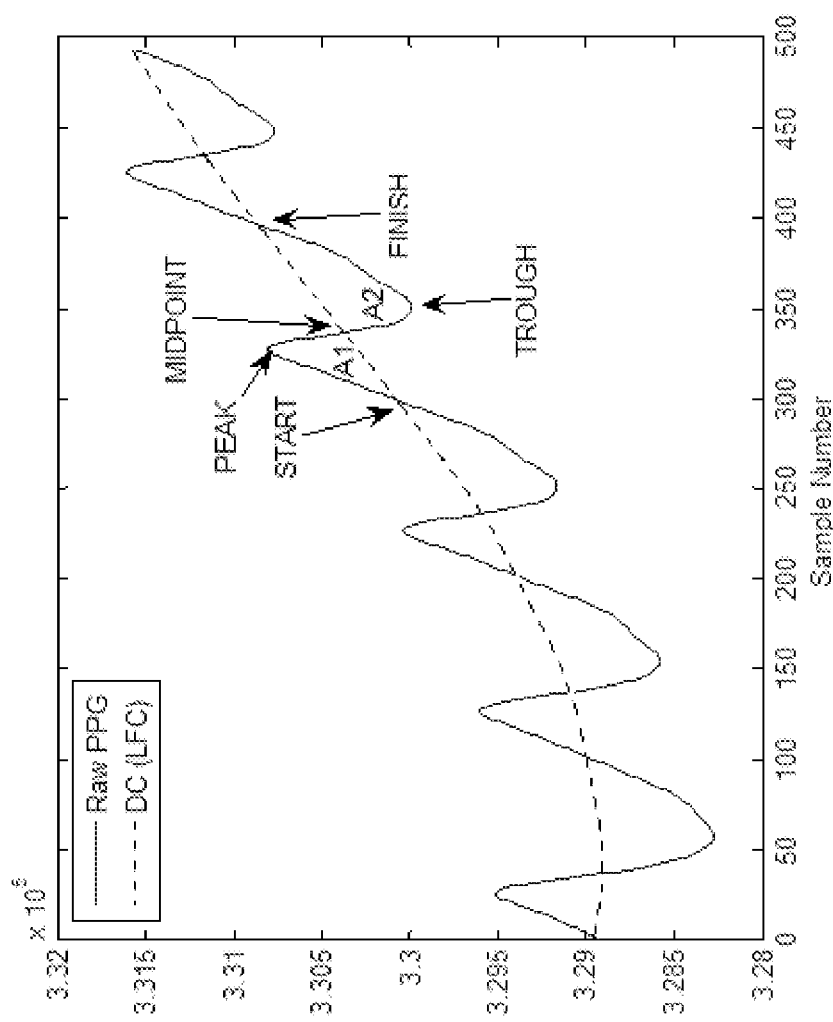
FIG. 2 is an example of a raw PPG signal and its corresponding low frequency (DC) component. The basic features of an individual heart beat are labeled. The unbroken line is the raw PPG signal and the dashed line is the DC component of the raw PPG signal.

Referring to FIG. 2, which provides a raw PPG signal stream plotted with its DC component signal stream, the following waveform parameters are defined as follows:

Peak Height is the amplitude difference between the cardiac peak and the DC component amplitude at the time corresponding to the cardiac peak.

Trough Depth is the amplitude difference between the cardiac trough and the DC component amplitude at the time corresponding to the cardiac trough.

AC Peak-to-Peak includes both the additive and subtractive AC Peak-to-Peak values. The additive AC Peak-to-Peak is the sum of the Peak Height and the Trough Depth, and the subtractive AC Peak-to-Peak is the Peak Height subtracted by the Trough Depth.

Top Area is the area under the curve of the positive portion (portion above the DC component) of the cardiac signal. It is labeled as A1 in FIG. 2.

Bottom Area is the area under the curve of the negative portion (portion under the DC component) of the cardiac signal. It is labeled as A2 in FIG. 2.

Peak Rise Time is the time it takes for the cardiac signal to go from the "START" to the "PEAK," as depicted in FIG. 2.

Rise Time Ratios includes the total beat Rise Time Ratio and the positive portion Rise Time Ratio. The total beat Rise Time Ratio is the ratio of Peak Rise Time to the total beat time (time from START to FINISH) and the positive Rise Time Ratio is the ratio of the Peak Rise Time to the positive portion time (time from START to MIDPOINT).

Trough Fall Time is the time it takes for the cardiac signal to go from the "MIDPOINT" to the "TROUGH".

Fall Time Ratio(s) is the ratio of Trough Fall Time to the total beat time (FINISH-START) or the ratio of Trough Fall Time to the negative portion time (FINISH-MIDPOINT).

Time Ratio is the Trough Fall Time divided by the Peak Rise Time.

Peak Trough Ratio is the Peak Height divided the Trough Depth.

Area Ratio is the Top Area (A1 in FIG. 2) divided by the Bottom Area (A2 in FIG. 2).

Mean DC is the mean DC amplitude taken from "START" to "FINISH" for each heart beat.

Min DC is the maximum DC amplitude taken from "START" to "FINISH" for each heart beat.

Max DC is the minimum DC amplitude taken from "START" to "FINISH" for each heart beat.

DC Swing is the difference in amplitude between the Max DC and the Min DC.

DC Variance is the variance of the DC signal taken from "START" to "FINISH" for each heart beat.

DC Area is the area under the curve between the DC signal and a calculated "baseline" DC. The calculated baseline is the average DC values over a prior predefined time period.

AC-DC Ratio is the AC Peak-to-Peak normalized by DC Mean.

RED-IR Ratios is the RED version of any of the above parameters divided by the IR version of that parameter.

SpO2: RED AC-DC Ratio divided by IR AC-DC Ratio.

The waveform parameters may be plotted over time to create a waveform parameter data stream that tracks respiration in the individual. In some embodiments of the invention, a band pass filter may be used to post-process the waveform parameter data stream. A band pass filter may be used to cut off signals above or below a predetermined frequency range. In particular embodiments, a band pass filter is used to remove signals having a frequency less than 3 cycles/minute or greater than 40 cycles/minute. In some embodiments, a calculated respiration rate may be used to center a band pass filter, so that as the respiration rate changes, the frequency band for the band pass filter may vary in an iterative process. In some cases, the frequency band may have a certain width but the center of the frequency band varies with the change in the individual's respiration rate.

FIG. 3 illustrates the benefit of using a band pass filter on a waveform parameter data stream. FIG. 3A shows the thermistor waveform, whereby the thermistor detects air flow (by change in air temperature) at the nose. FIG. 3B shows a waveform of the IR Top Area over time. While it is clear that respiration is being detected by this waveform parameter, there is noise in the waveform. FIG. 3B shows the IR Top Area over time after a band pass filter. It can be observed that the band pass filter may produce a cleaner respiration signal.

In some embodiments of the invention, the waveform parameter over time (e.g., IR Top Area) or its band pass filtered counterpart may be further analyzed to quantify respiration. For example, a predetermined change in slope of the waveform may be considered to signify a breath. Other methods include zero crossings methods, whereby a breath is deemed to have occurred if the signal crosses a zero point twice. This can also be achieved by a "band crossing method" whereby a breath is deemed to have occurred if the signal crosses an amplitude band twice. Once the signal crosses the amplitude band (or zero crossings point), an algorithm may be used to determine whether the signal crossing is statistically valid (e.g., via a t-test) and if not, the algorithm may then be iterated. Any other suitable signal processing method for breath detection may also be used.

Two or more waveform parameters can also be compared to assess different measures of respiration (e.g., respiratory rate vs. respiratory effort) and to determine coincidence between different channels, which can produce a confidence metric regarding whether a respiration event, such as a breath, has occurred. Some parameters may operate independently from other parameters so the determination of respiration by two or more waveform parameters may allow for additional confidence in the accuracy of the respiratory determinations. For example, the IR Top Area may detect a strong respiratory component at one time while the IR DC Swing does not, but at a later time, these roles may reverse. By comparing the values over time (e.g., measuring their coincidence), the actual respiratory events occurring in the patient may be better assessed. IR and Red channels may also provide additional modes of comparison to improve accuracy of the determination of respiratory events, and the inventors have determined that the IR and Red channels may act independently from each other. Thus, the confidence metric obtained from multiple channels may be a measure of the strength and certainty of a respiratory parameter for a particular region of data. As an example, if two parameters (e.g., IR Top Area and Red DC Swing) compute the same RR to within a predetermined number of cycles per minute, then we can determine how confident we are that the respiration rate calculation is accurate. This can help detect artifacts, such as those due to motion, in the data and distinguish the artifact from respiratory component features. As used herein, the term "confidence metric" is a measure of how likely the event is to have occurred. For example, in some cases, the confidence metric may be a percentage up to 100%, and if the confidence metric is above a certain percentage (e.g., 90% or greater or 95% or greater), the determination will be considered accurate enough to report to medical personnel or used in a respiratory calculation (e.g., respiration rate). If the confidence metric calculated is not above the predefined percentage, the calculation may be repeated for a later time point, or a predetermined reaction (e.g., an alarm) may be effected.

Figure 4:
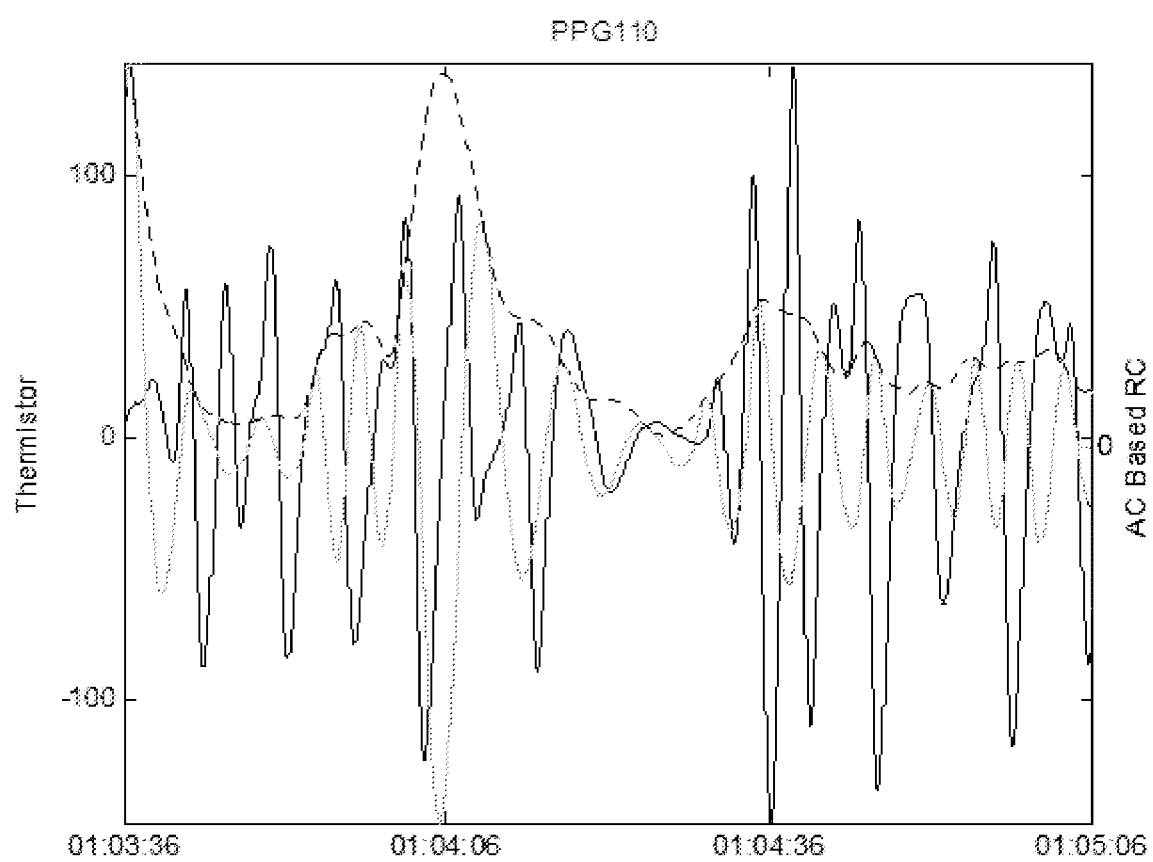
FIG. 4 shows overlaid spectra from data taken from a spontaneously breathing patient in the operating room. The black line is a thermistor waveform representing air inhalation and exhalation. The grey line shows a waveform parameter according to an embodiment of the invention, after a band-pass filter centered on an expected respiratory rate. The dashed line shows the envelope of the waveform parameter signal stream and the size and shape of this envelope provides information regarding the respiratory effort of the individual.

The envelope of any of the waveform parameter data streams may also be used to determine respiratory effort in the individual. FIG. 4 shows PPG and thermistor data from a spontaneously breathing individual. The black line corresponds to the thermistor signal obtained at the nose. The grey line shows a PPG-based waveform parameter (over time) that has been passed through a band pass filter centered at the current respiration rate. The dashed line is the envelope of the PPG-based waveform parameter signal, which provides information on the respiratory effort of the individual. This shows that by using a known respiration rate (either calculated from PPG or obtained from an external signal such as a thermistor signal), a band pass filter may provide a cleaner signal for use when measuring the envelope. The envelope may be calculated by any suitable technique, including using a Hilbert transform (or similar) approach. The height, area under the curve or slope of the envelope may then be used to determine respiratory effort, whereby the greater height, area under the curve and/or slope may be correlated with greater respiratory effort. Additionally, in some embodiments, respiratory effort may be calibrated, for example, by taking PPG measurements while the patient breathes through a resistor having a known resistance.

Combining Data from Waveform Parameters with Data from Secondary Respiration Sensors Secondary respiration sensors may be used to compare with the respiratory information obtained from the PPG sensor(s). Such sensors include, but are not limited to, nasal air flow sensors, nasal pressure sensors, capnometers, thermistors, acoustic sensors, differential pressure transducers, chest or abdominal bands, and the like. In some cases, both the PPG sensor(s) and the secondary respiration sensor(s) are situated at the nose, and in some cases, a single device or system (e.g., an array) may include both the PPG sensor (s) and the secondary respiration sensor(s).

In some embodiments, the secondary respiration sensor may detect respiratory airflow or temperature changes at the nostril, such as with a thermistor. For example, during inspiration, a thermistor placed at the nostril detects a relative decrease in temperature compared to exhalation since, in most situations, body temperature, and therefore exhaled breath temperature, is higher than ambient temperature. Thus, detection of changes in temperature may be a suitable means to determine respiratory air flow and therefore, respiratory rate. Air flow from one or both nostrils may be monitored and compared with the PPG information.

As another example, capnometry may provide a number of respiratory parameters. Such parameters may generally be reliably used for monitoring adequacy of ventilation if the patient is intubated. Unfortunately both hyper- and hypoventilation in patients may cause the results may be unreliable. However, in some cases, capnometry may be useful as a secondary respiration sensor to detect the respiratory airflow and thus may be used to validate the PPG-based respiratory determinations.

The respiratory data from the secondary respiration sensor may be handled analogously to the PPG data. As the amplitudes of the secondary respiration sensor signals may change with respiratory air flow such as inhalation and exhalation, a zero cross method may be used to measure whether respiratory airflow is sufficient to be deemed ventilation. In such methods, a zero point (baseline) may be determined and if the signal stream amplitude crosses the zero point twice (once for inspiration and once for expiration), a breath may be deemed to have occurred. In some embodiments, a "band cross" method may be used such that an amplitude range centered around a zero crossing point may be assigned to the signal, and the size of the band may be determined, for example as fixed amplitude band or as a percentage of the total signal amplitude. In such cases, a breath is determined to have occurred when the signal crosses the amplitude band twice (inspiratory effort and expiratory effort). This is analogous to the zero point crossing method but instead of a single point, the signal must cross the amplitude band for a breath to have been deemed to occur. This decreases the likelihood that noise in the signal will affect the respiration rate. Once the signal crosses the amplitude band, the algorithm may determine whether the signal crossing is statistically valid (e.g., via a t-test) and if not, the algorithm may then be iterated.

As with the different channels obtained solely from the PPG signal, in some embodiment of the invention, the signals from the secondary respiration sensor(s) and/or the respiratory information determined therefrom may be used to validate or confirm data or determinations from the PPG sensor. Thus, the confidence metric described above may, in some cases, be based in part on data from a secondary respiration sensor and the waveform parameter data stream.

Devices an Systems for Monitoring Respiration

The methods described herein may be performed by any suitable device, such as, for example, a general-purpose microprocessor (which may include one, two or more individual microprocessors), a digital signal processor (DSP) or application specific integrated circuit (ASIC). Such a microprocessor may be adapted to execute software, which may include an operating system and one or more applications, as part of performing the functions described herein. In electronic communication with the microprocessor may be a computer memory, such as a read-only memory (ROM), random access memory (RAM), and the like. Any suitable computer-readable media may be used in the system for data storage. Computer-readable media are capable of storing information that can be interpreted by microprocessor. This information may be data or may take the form of computer-executable instructions, such as software applications, that cause the microprocessor to perform certain functions and/or computer-implemented methods. Depending on the embodiment, such computer-readable media may include computer storage media and communication media.

Computer storage media may include volatile and non-volatile, removable and non-removable media implemented in any method or technology for storage of information such as computer-readable instructions, data structures, program modules or other data. Computer storage media may include, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by components of the system.

In particular embodiments of the invention, a microprocessing device is configured to isolate the AC component signal stream, the DC component signal stream, or both, from a raw PPG signal. The device may use any suitable processing method to achieve this, including the methods described above. In some embodiments, the microprocessing device conditions the PPG signals prior to separation of the AC and DC component signal streams. In some embodiments of the invention, the microprocessing device calculates one or more waveform parameters from one or more PPG signal streams, incorporating the methods discussed herein, and respiratory events may be qualitatively or quantatatively monitored via the waveform parameter data stream. Additionally, in some embodiments, the microprocessing device post-processes the waveform parameter data streams, for example by using band pass filters, as described in further detail above. The microprocessing device may also then determine a level or change in respiratory effort of the individual based on an envelope of at least one of the waveform parameters.

According to some embodiments of the invention, the microprocessing device further analyzes one or more of the channels, including channels obtained from different waveform parameters, different emission wavelengths and/or from secondary respiration sensors. The microprocessing device may include an algorithm that weights a confidence metric based on a predetermined agreement level between two, three or more different channels. If the confidence metric is above a predetermined value, a predefined response is effected. For example, in some cases, the predefined response is that the respiratory event such as a breath or a respiratory effort, may be considered to have occurred by the processor and so may be displayed or used in other calculations. If the predetermined value is below a threshold level, then further data, such as a later time point or an additional data stream or parameter, may be analyzed. Such calculations may be performed at a sufficiently rapid pace so that results may be displayed on a real time basis.

Also provided according to embodiments of the present invention are systems that include at least one PPG sensor and a microprocessing device according to an embodiment of the invention. In some embodiments, the systems may also include a secondary respiration detector. Furthermore, such systems may include a monitor or some other display device to communicate the respiration data to medical personnel, caregivers and/or the individual. The systems may further include an alarm system, which in some embodiments is part of the microprocessing device, to provide an alarm when the respiratory information from the PPG sensor indicates that an adverse respiratory event is occurring or has occurred, or that the individual otherwise needs medical attention. The alarm may be configured to alert medical personnel or caregivers, or it may be configured to alert or stimulate the individual to breathe. Examples of alarms include auditory alarms, electrical stimulation of the individual, wisps of air applied to the individual's face, and the like. In some embodiments, the system may also be configured to alert medical personnel or to take another appropriate action (such as reduction in medication administration or increased supply of air to the patient), at the time the stimulus is applied and/or when the stimulus does not restore the patient's breathing to acceptable levels.

In the drawings and specification, there have been disclosed embodiments of the invention and, although specific terms are employed, they are used in a generic and descriptive sense only and not for purposes of limitation, the scope of the invention being set forth in the following claims.

I claim:

1. A microprocessing device configured to:
receive, in real time from a photoplethysmography (PPG) sensor, a raw PPG signal obtained from an individual, wherein the individual is spontaneously breathing and non-intubated;
isolate, in real time, a DC component signal stream, from the raw PPG signal by interpolating peaks of the raw PPG signal to generate an interpolated peak line, interpolating troughs of the raw PPG signal to generate an interpolated trough line, and averaging the interpolated peak line and the interpolated trough line to produce the DC component signal stream;
generate, in real time, a plot that represents the raw PPG signal and the DC component signal stream overlying each other, wherein the raw PPG signal is a waveform that intersects the DC component signal stream at midpoints of the raw PPG signal between the peaks and the troughs a plurality of times in the plot,
wherein a first curve of the DC component signal stream on the plot intersects a first midpoint of the midpoints of the raw PPG signal at a first end of the first curve and intersects a second midpoint of the midpoints of the raw PPG signal at a second end of the first curve, and is above a first curve of the raw PPG signal on the plot, and
wherein a second curve of the DC component signal stream on the plot intersects a third midpoint of the midpoints of the raw PPG signal at a first end of the second curve and intersects a fourth midpoint of the midpoints of the raw PPG signal at a second end of the second curve, and is below a second curve of the raw PPG signal on the plot;
calculate, in real time, one or more waveform parameters from the isolated DC component signal stream and the raw PPG signal to produce at least one waveform parameter data stream, wherein the one or more waveform parameters comprises a Top Area bounded by the second curve of the DC component signal stream on the plot and the second curve of the raw PPG signal on the plot, and a Bottom Area bounded by the first curve of the DC component signal stream on the plot and the first curve of the raw PPG signal on the plot, wherein the Bottom Area is an area under the first curve of the DC component signal stream on the plot and above the first curve of the raw PPG signal on the plot, and wherein the Top Area is an area above the second curve of the DC component signal stream on the plot and below the second curve of the raw PPG signal on the plot;
determine, in real time, whether a respiratory event has occurred in the individual by analyzing the produced at least one waveform parameter data stream and based on an Area Ratio that is the Top Area divided by the Bottom Area; and
report, in real time, the respiratory event to a caregiver substantially at the same time that the respiratory event occurs.

2. The device of claim 1, wherein the raw PPG signal stream is obtained from light emitted at an IR wavelength.

3. The device of claim 1, wherein the raw PPG signal stream is obtained from light emitted at a red wavelength.

4. The device of claim 1, wherein the at least one waveform parameter is calculated for substantially every cardiac peak in the raw PPG signal stream.

5. The device of claim 1, wherein the PPG signal stream is obtained from a central source site of the individual.

6. The device of claim 5, wherein the central source site is a nasal alar, nasal septum or nasal columella.

7. The device of claim 1, wherein the at least one waveform parameter is used to determine respiratory rate, respiratory effort, or both.

8. The device of claim 1, wherein the at least one waveform parameter is calculated from both a PPG signal stream obtained from light emitted in an IR wavelength and from a PPG signal stream obtained from light emitted at a red wavelength.

9. The device of claim 8, wherein a waveform parameter calculated from a red PPG signal stream is compared with a waveform parameter calculated from an IR PPG signal stream, and a confidence metric regarding whether a respiratory event occurred is generated based on the red waveform parameter and the IR waveform parameter.

10. A system comprising a device of claim 1 and the PPG sensor.

11. The system of claim 10, further comprising a secondary respiration sensor, wherein the secondary respiration sensor is not a PPG sensor.

12. The system of claim 11, wherein the microprocessing device is further configured to:
receive, from the secondary respiration sensor, a raw respiration sensor signal;
calculate one or more waveform parameters from the received raw respiration sensor signal to produce a second waveform parameter data stream;
determine whether a respiratory event has occurred in the individual by analyzing the second waveform parameter data stream;
compare the respiratory event determined from the PPG signal to the respiratory event determined by from the respiration sensor signal; and
determine a confirmed respiratory event when the respiratory event determined from the PPG signal matches the respiratory event determined by from the respiration sensor signal.

13. The device of claim 1, wherein determining whether the respiratory event has occurred in the individual by analyzing the produced at least one waveform parameter data stream comprises analyzing a change in slope of the waveform over time, wherein the change in slope of the waveform indicates a breath.

14. The device of claim 1, wherein determining whether the respiratory event has occurred in the individual by analyzing the produced at least one waveform parameter data stream comprises a zero crossings method, wherein a breath is identified when the waveform parameter data stream crosses a zero point twice.

15. The device of claim 1, wherein determining whether the respiratory event has occurred in the individual by analyzing the produced at least one waveform parameter data stream comprises a band crossing method, wherein a breath is identified when the waveform parameter data stream crosses an amplitude band twice.

16. The device of claim 15, wherein the microprocessing device is further configured to determine whether an amplitude band crossing is statistically valid.

17. At least one non-transitory computer readable storage medium, comprising a set of instructions, which when executed by a computing device, cause the computing device to:
receive, in real time from a photoplethysmography (PPG) sensor, a raw PPG signal obtained from an individual, wherein the individual is spontaneously breathing and non-intubated;
isolate, in real time, a DC component signal stream, from the raw PPG signal by interpolating peaks of the raw PPG signal to generate an interpolated peak line, interpolating troughs of the raw PPG signal to generate an interpolated trough line, and averaging the interpolated peak line and the interpolated trough line to produce the DC component signal stream;
generate, in real time, a plot that represents the raw PPG signal and the DC component signal stream overlying each other, wherein the raw PPG signal is a waveform that intersects the DC component signal stream at midpoints of the raw PPG signal between the peaks and the troughs a plurality of times in the plot,
wherein a first curve of the DC component signal stream on the plot intersects a first midpoint of the midpoints of the raw PPG signal at a first end of the first curve and intersects a second midpoint of the midpoints of the raw PPG signal at a second end of the first curve, and is above a first curve of the raw PPG signal on the plot, and
wherein a second curve of the DC component signal stream on the plot intersects a third midpoint of the midpoints of the raw PPG signal at a first end of the second curve and intersects a fourth midpoint of the midpoints of the raw PPG signal at a second end of the second curve, and is below a second curve of the raw PPG signal on the plot;
calculate, in real time, one or more waveform parameters from the isolated DC component signal stream and the raw PPG signal to produce at least one waveform parameter data stream, wherein the one or more waveform parameters comprises a Top Area bounded by the second curve of the DC component signal stream on the plot and the second curve of the raw PPG signal on the plot, and a Bottom Area bounded by the first curve of the DC component signal stream on the plot and the first curve of the raw PPG signal on the plot, wherein the Bottom Area is an area under the first curve of the DC component signal stream on the plot and above the first curve of the raw PPG signal on the plot, and wherein the Top Area is an area above the second curve of the DC component signal stream on the plot and below the second curve of the raw PPG signal on the plot;
determine, in real time, whether a respiratory event has occurred in the individual by analyzing the produced at least one waveform parameter data stream and based on an Area Ratio that is the Top Area divided by the Bottom Area; and
report, in real time, the respiratory event to a caregiver substantially at the same time that the respiratory event occurs.

18. A method comprising:
receiving, in real time from a photoplethysmography (PPG) sensor, a raw PPG signal obtained from an individual, wherein the individual is spontaneously breathing and non-intubated;
isolating, in real time, a DC component signal stream, from the raw PPG signal by interpolating peaks of the raw PPG signal to generate an interpolated peak line, interpolating troughs of the raw PPG signal to generate an interpolated trough line, and averaging the interpolated peak line and the interpolated trough line to produce the DC component signal stream;
generating, in real time, a plot that represents the raw PPG signal and the DC component signal stream overlying each other, wherein the raw PPG signal is a waveform that intersects the DC component signal stream at midpoints of the raw PPG signal between the peaks and the troughs a plurality of times in the plot,
wherein a first curve of the DC component signal stream on the plot intersects a first midpoint of the midpoints of the raw PPG signal at a first end of the first curve and intersects a second midpoint of the midpoints of the raw PPG signal at a second end of the first curve, and is above a first curve of the raw PPG signal on the plot, and
wherein a second curve of the DC component signal stream on the plot intersects a third midpoint of the midpoints of the raw PPG signal at a first end of the second curve and intersects a fourth midpoint of the midpoints of the raw PPG signal at a second end of the second curve, and is below a second curve of the raw PPG signal on the plot;
calculating, in real time, one or more waveform parameters from the isolated DC component signal stream and the raw PPG signal to produce at least one waveform parameter data stream, wherein the one or more waveform parameters comprises a Top Area bounded by the second curve of the DC component signal stream on the plot and the second curve of the raw PPG signal on the plot, and a Bottom Area bounded by the first curve of the DC component signal stream on the plot and the first curve of the raw PPG signal on the plot, wherein the Bottom Area is an area under the first curve of the DC component signal stream on the plot and above the first curve of the raw PPG signal on the plot, and wherein the Top Area is an area above the second curve of the DC component signal stream on the plot but below the second curve of the raw PPG signal on the plot; and determining, in real time, whether a respiratory event has occurred in the individual by analyzing the produced at least one waveform parameter data stream and based on an Area Ratio that is the Top Area divided by the Bottom Area; and reporting, in real time, the respiratory event to a caregiver substantially at the same time that the respiratory event occurs.

\* \* \* \* \*